Aug. 13, 1940.  D. G. TAYLOR  2,211,735
SWITCHING MECHANISM
Filed May 7, 1937   4 Sheets-Sheet 1
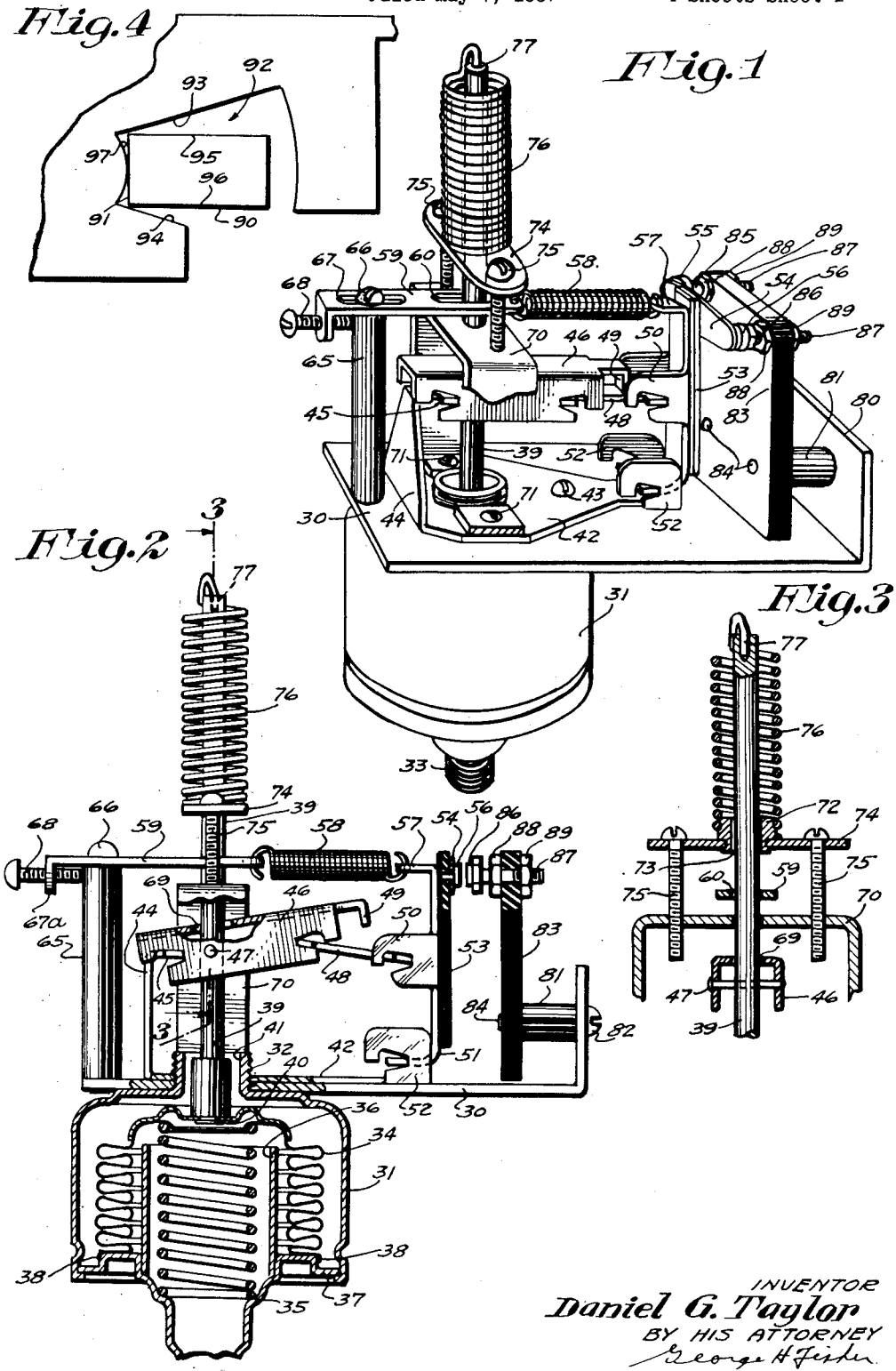
INVENTOR
*Daniel G. Taylor*
BY HIS ATTORNEY
*George H Fisher*

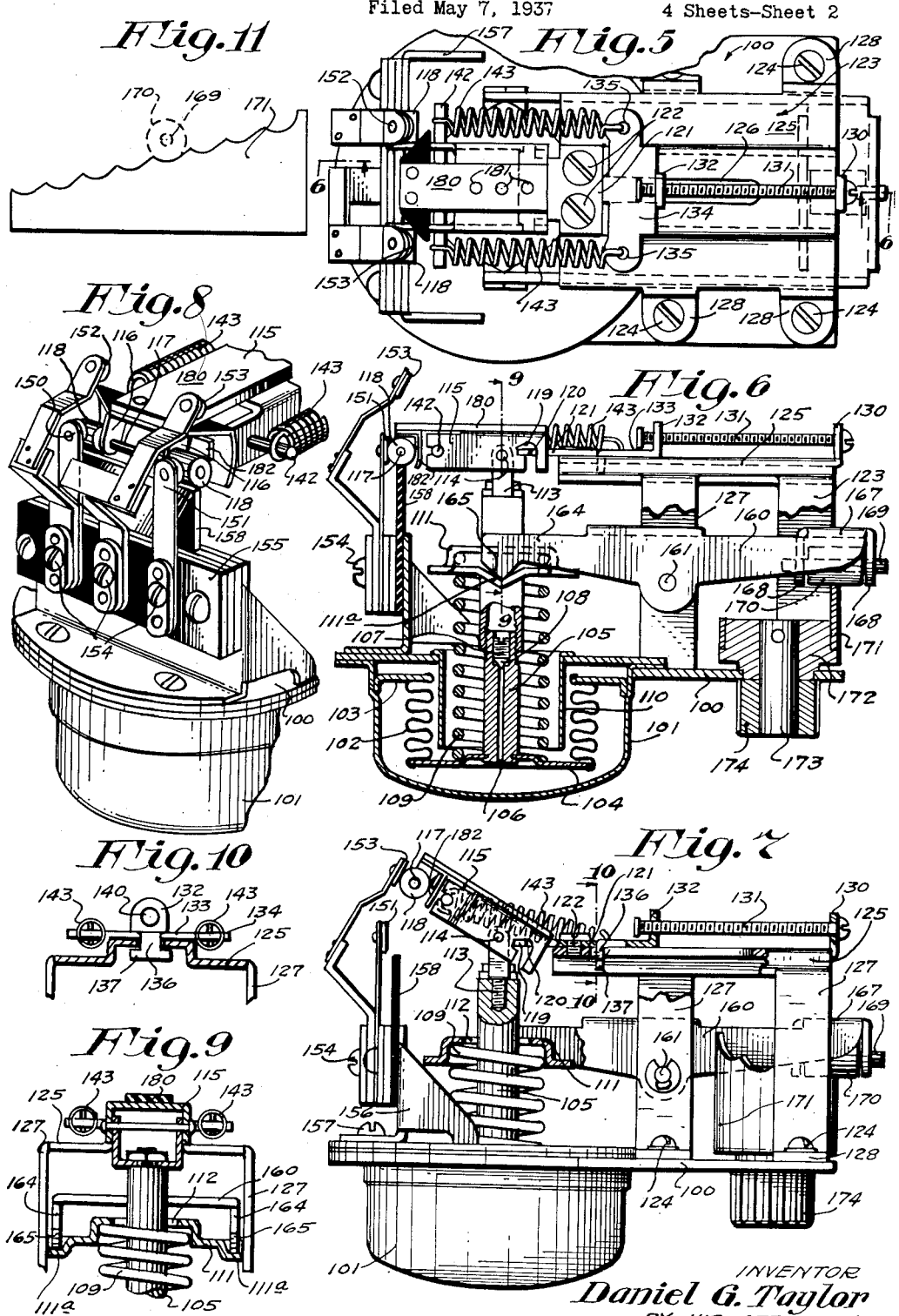

Aug. 13, 1940.  D. G. TAYLOR  2,211,735
SWITCHING MECHANISM
Filed May 7, 1937  4 Sheets-Sheet 3
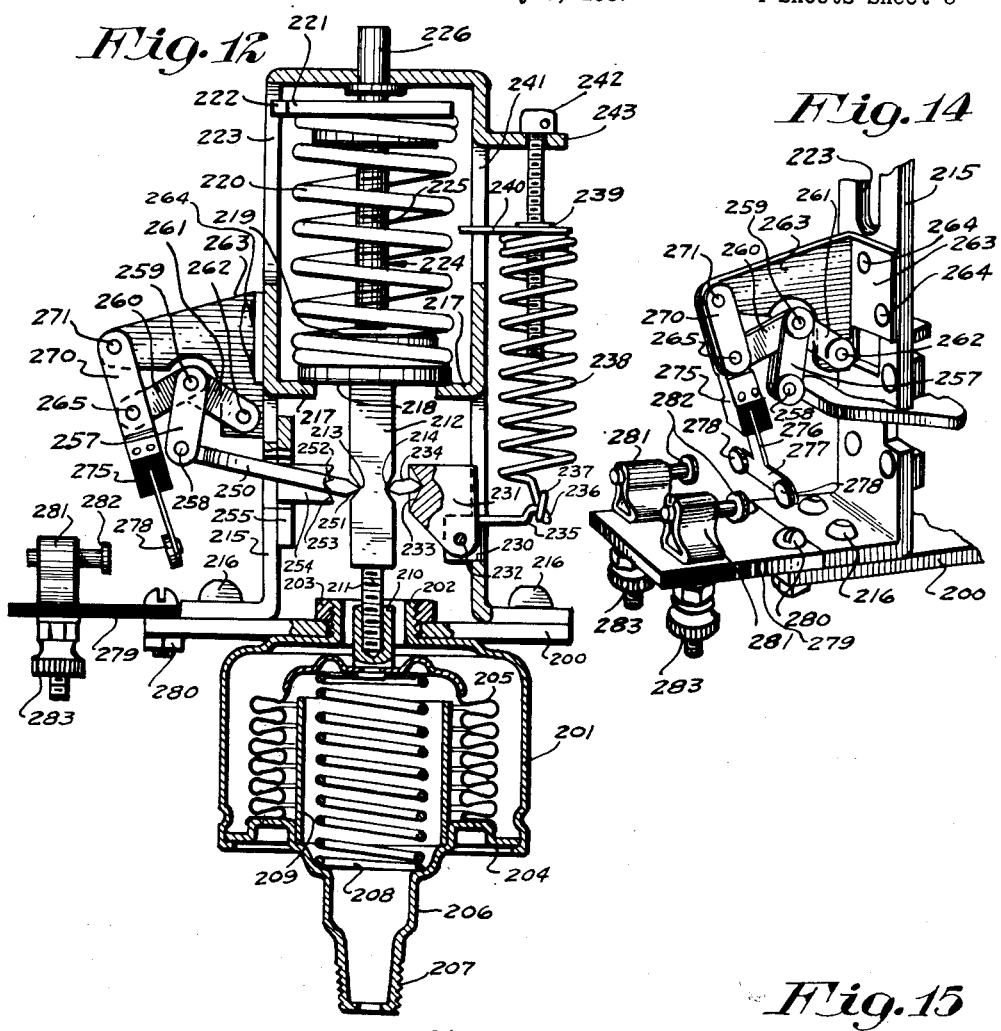
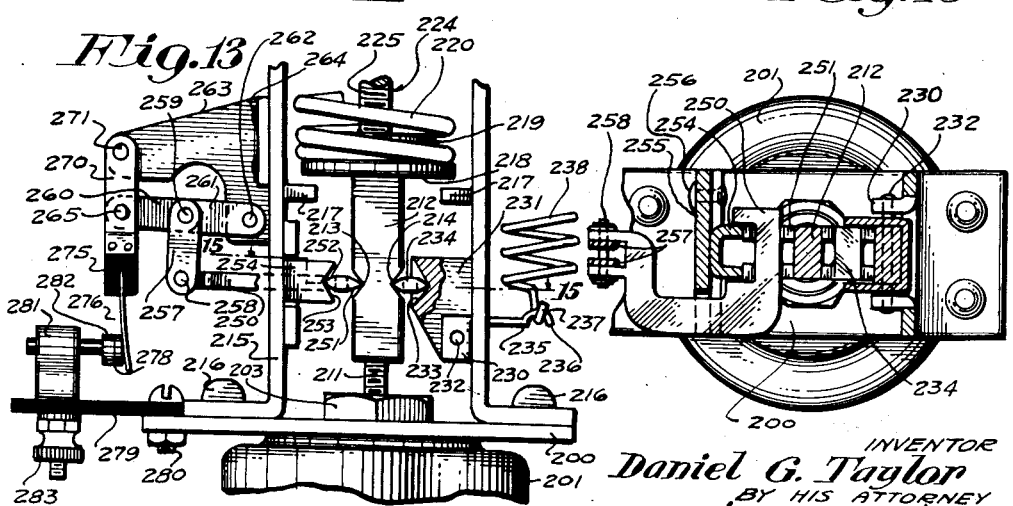
INVENTOR
Daniel G. Taylor
BY HIS ATTORNEY
George H Fisher

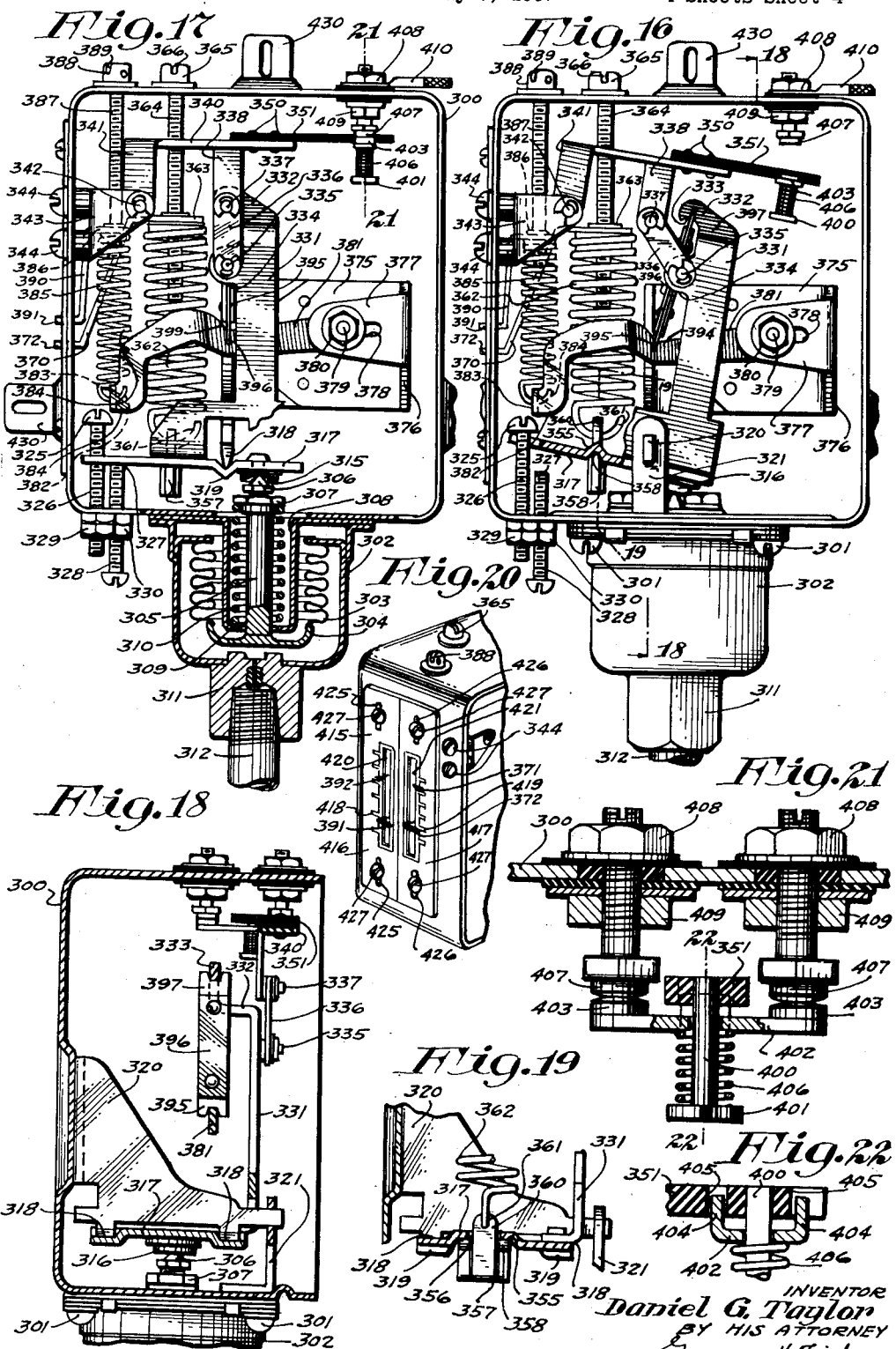

Patented Aug. 13, 1940

2,211,735

UNITED STATES PATENT OFFICE 2,211,735

SWITCHING MECHANISM

Daniel G. Taylor, Minneapolis, Minn., assignor to Minneapolis-Honeywell Regulator Company, Minneapolis, Minn., a corporation of Delaware Application May 7, 1937, Serial No. 141,297

28 Claims. (Cl. 200—83)

This invention relates to switching mechanism and more particularly to a type of mechanism adapted to open and/or close a circuit upon change in the value of a condition.

Any resilient body such for example as a bellows, or a coil spring, if unopposed by any external force, has a natural or normal length or shape. Take the bellows for example; if unopposed by external forces any particular bellows will assume a certain normal length. Now if a slight compressive force is applied to the bellows it will be compressed slightly until the resilience of the bellows itself develops an equal force to balance the original applied force. An increase in the applied force will compress the bellows further until its resilience develops an equal and opposite force to balance it. The rate at which the bellows develops the internal balancing force for the external applied force is called the spring rate of the bellows.

Assume now that a bellows is fixed at one end and free at the other and that the free end is operating between two stops. Assume also for example that a pressure of five pounds within the bellows is required to start to move its free end. Due to its spring rate the pressure must gradually increase, say to ten pounds, to gradually move the bellows from one stop to the other. In other words, each time the bellows is moved slightly it develops an additional internal force to balance the external force which caused its movement, so that for every external pressure of from five to ten pounds the bellows has a corresponding length. This is the normal operation of a bellows.

Suppose, however, that it is desired to have the bellows operate so that a force which is great enough to start to move the bellows is sufficient to continue its movement throughout its entire stroke. To do this, it is necessary to develop a force which is exactly equal and opposite to the force developed in the bellows due to its spring rate; or in other words, it is necessary to compensate the spring rate of the bellows. This force must equal zero when the bellows is in one position and must increase gradually and oppositely to the resilient force in the bellows as it moves from one position to another. The external force moving the bellows will now be unopposed and will therefore move the bellows the entire distance of its stroke without stopping.

The same principle may be applied in compensating the spring rate of the coil spring.

It is therefore an object of this invention in a control device having a main adjusting spring which is alternately compressed and elongated during the normal operation of the device to provide mechanism for compensating the spring rate of such adjusting spring.

It is also an object of this invention, where a resilient condition responsive device is used, such as a bellows, for example, to provide mechanism for compensating the spring rate of such condition responsive device.

A further object is to compensate the spring rates of all resilient members which affect the operation of a control member so that the control member will operate over its entire range of movement after it has once been started by the condition responsive device which controls it.

An additional object is the provision of an improved contact structure operable to maintain a contact in association with another contact with a relatively great pressure until such time as the mechanism moving the contact has moved to such a point that the contacts will be relatively rapidly separated.

A further object is the provision of such a mechanism wherein the contact pressure of a pair of opposed contacts will remain relatively great until such time as the contacts are opened abruptly or with a snap action.

A still further object is the provision of an improved means of compensating for the increased force exerted by a spring opposing a condition responsive element in combination with a contact structure in such manner that the compensating spring will serve to separate said contacts relatively rapidly but only after a relatively substantial movement of the condition responsive element.

An additional object is the provision of an improved leverage arrangement whereby a relatively slight movement of a condition responsive element is amplified to a relatively great movement of a contact, such leverage arrangement serving simultaneously to eliminate what is known in the art as vanishing contact pressure. In devices of an analogous nature hitherto constructed considerable difficulty has existed in that as a condition responsive element moved slightly in response to a change in the value of a condition, the pressure of a contact moved thereby against an adjacent contact was lessened a corresponding amount. Accordingly, at one point in the movement of the operating mechanism, the contacts were in engagement but the force exerted to hold said contacts in engagement was so slight that vibration resulted which frequently occasioned arcing between the contacts. This defect is known as vanishing contact pressure. It is, therefore, an object of this invention to preclude vanishing contact pressure since with the structure to be hereinafter described a relatively firm engagement of the contacts is maintained until such time as the operating mechanism has moved sufficiently to separate the contacts a relatively great distance relatively rapidly.

A further and more specific object of this invention is the provision of improved means properly to regulate the force exerted by either or both of the resilient means utilized to obtain the result just described.

A further object of this invention is the provision of an improved artificial knife edge construction obviating the necessity of preforming certain parts of the mechanism with a relatively fine knife edge, the artificial knife edge structure accomplishing all the advantages of such a structure preformed as above mentioned.

An additional specific object of the invention is the provision of an improved scale plate adapted to be utilized in connection with the mechanism to be hereinafter described whereby an instrument may be calibrated without adjustment of interior mechanism.

A further specific object is the provision of improved means for adjusting the tension or compression of a spring adapted to act against the force exerted by a condition responsive element to move a contact or analogous mechanism.

A still further specific object is the provision of mechanism embodying the features above and to be hereinafter described which is relatively simple and inexpensive in construction and is sturdy, durable and reliable in operation.

Other objects will in part be obvious and in part pointed out hereinafter.

The invention accordingly consists in the combinations of elements, arrangements of parts and features of construction, all as will be more fully described hereinafter and shown in the accompanying drawings.

Referring now to the drawings wherein are shown several illustrative embodiments of the invention:

Figure 1 is a perspective view of one form of switching mechanism embodying features of the instant invention;

Figure 2 is a side sectional elevational view of the device of Figure 1;

Figure 3 is a sectional view taken along the line 3—3 of Figure 2 as viewed from the left.

Figure 4 is an enlarged view showing certain details of construction;

Figure 5 is a plan view of a second structure embodying features of the invention, certain parts thereof being broken away;

Figure 6 is a sectional view taken along the line 6—6 of Figure 5 as viewed from the bottom;

Figure 7 is a side elevational view of the mechanism shown in Figures 5 and 6, parts thereof being shown in a different position;

Figure 8 is a perspective view showing certain other features of the structure shown in Figures 5, 6 and 7;

Figure 9 is a sectional view along the line 9—9 of Figure 6 as viewed from the left;

Figure 10 is a side sectional view taken along the line 10—10 of Figure 7 as viewed from the left;

Figure 11 is an enlarged elevational view, partly schematic, showing certain details of construction;

Figure 12 is a side elevational view partly in section of a still further form of switching mechanism embodying certain features of the instant invention;

Figure 13 is a fragmentary view showing certain portions of the structure shown in Figure 12 in a different position;

Figure 14 is a fragmentary perspective view showing certain portions of the mechanism shown in Figure 12;

Figure 15 is a sectional view taken along the line 15—15 of Figure 13 as viewed from the top;

Figure 16 is a front elevational view of a still further modified form of the invention certain parts being removed for the sake of clarity;

Figure 17 is a view similar to Figure 16 but showing the parts in a different position, certain parts thereof being cut away in order that certain other parts may be more clearly shown;

Figure 18 is a side sectional view taken substantially along the line 18—18 of Figure 16 as viewed from the left, certain parts thereof being cut away and certain other parts being omitted;

Figure 19 is a detailed side sectional view taken along the line 19—19 of Figure 16 as seen from the left, certain parts thereof being broken away;

Figure 20 is a reduced perspective view showing a portion of the exterior of the casing utilized with the instrument shown in Figures 16, 17 and 18 showing certain features of the invention;

Figure 21 is an enlarged sectional view taken along line 21—21 of Figure 17, and Figure 22 is sectional view taken along the line 22—22 of Figure 21, certain parts thereof being broken away.

Similar reference characters refer to similar parts throughout the several views of the drawings.

Referring now to the switching mechanism disclosed in Figures 1 to 4, inclusive, 30 indicates a mounting or base plate to which is secured a casing or housing 31 in any suitable manner, as by threaded engagement of a threaded extending portion 32 with a suitable threaded aperture in base plate 30. A projection 33 extends from housing 31 to which may be secured any suitable pressure or other condition responsive mechanism. Such mechanism is not shown but may readily take the form of a conventional bulb and capillary tube arrangement. Housing 31 contains a bellows 34 of conventional construction biased upwardly as by a spring 35, a guide member 36 being provided to prevent complete collapse of bellows 34, in the absence of any pressure thereon. Bellows 34 is secured to the base plate 37 of casing 31 in any suitable manner as by soldering as shown at 38. An operating rod 39 is secured to the upper portion of bellows 34 in any suitable manner as generally indicated at 40. Operating rod 39 extends upwardly through an aperture 41 in extending portion 32 of casing 31 and likewise, therefore, through the threaded aperture in plate 30. Thus, it will be seen that changes in pressure or temperature or other condition affecting the previously mentioned bulb is transmitted in a known manner through the capillary tube to cause expansion or contraction of bellows 34 and hence vertical movement of operating rod 39.

Secured to base plate 30 is a second plate 42, the securing means taking any desired form such as screws 43. Plate 42 has an upwardly extending portion 44 and an inwardly extending portion 45 on which is fulcrumed, in a manner to be hereinafter described more fully, a lever 46. Lever 46 is secured, as better shown in Figure 3, to operating rod 39 by means of a pin 47 passed through suitable apertures in lever 46 and operating rod 39. Thus, movement of operating member 39 is transmitted to rotative movement of the distal end of lever 46 about the pivotal mounting on portion 45. A second lever or link 48 is also pivotally secured to the distal end of lever 46. A stop member comprising a depending lug 49 is formed on the end of lever 46 and adapted to abut lever 48 for a purpose to be described hereinafter. The other end of lever 48 is pivotally associated with a pair of projections 50 carried by a member 51 which is in turn pivotally mounted in upstanding lugs 52 carried by plate 42. Member 51 carries a block of insulating material 53 to which is secured a resilient bar 54 carrying contacts 55 and 56. Member 51 has at its upper extremity a projection 57 having an aperture therein to which is secured one end of a spring 58. The other end of spring 58 is secured to a bar 59 having an aperture 60 therein through which operating rod 39 passes. Aperture 60 is of elongated shape to permit movement of bar 59 with respect to operating rod 39. Base plate 30 has secured thereto in any desired manner a post 65 which serves as a support for bar 59. A screw 66 passed through a second aperture 67 also of elongated shape engages a suitably threaded aperture in the upper end of post 65. A downwardly depending portion 67a of bar 59 is provided with a suitably threaded aperture through which is passed a screw 68 adapted to abut post 65.

Thus from the foregoing, it will be seen that rotation of screw 68 causes movement of bar 59 and a corresponding variation in the tension of spring 58, elongated apertures 60 and 67 permitting limited motion of bar 59. It will also be seen that screw 66 serves as a clamping or locking means to hold bar 59 in any position to which it may be moved by rotation of screw 68.

Operating rod 39 extends upwardly through an aperture 69 in lever 46 and thence through a suitable aperture in a supporting member 70 secured to plate 42, as by screws 71, then passing through aperture 60 extends through a bushing 72 having an aperture 73 therein and rigidly secured in any suitable manner to a bar 74. A pair of screws 75 movably connect bar 74 to support 70. A tension spring 76 has one end 77 rigidly secured to operating rod 39 in any desired manner, as by embedding the end thereof in a suitably formed aperture in the upper end of operating rod 39. The other end of spring 76 is engaged by bushing 72 and hence bar 74. Thus, it will be seen that rotation of screws 75 varies the position of bar 74 with respect to supporting member 70 and operating rod 39 and consequently the tension of spring 76.

Base plate 30 has an upwardly extending portion 80 to which are secured insulating blocks 81 as by screws 82, the other end of screws 82 engaging an insulating member 83 as shown at 84. Insulating member 83 carries a pair of contacts 85 and 86 secured thereto as by screws 87 and nuts 88 and 89. Suitable lead wires (not shown) may be secured by nuts 89 to screws 87 to provide electrical connections to contacts 85 and 86. Thus it will be seen that due to the insulation of member 83 no circuit may be established between contacts 85 and 86 unless bridged by opposed contacts 55 and 56 and their associated bar 54. Contacts 85 and 86 are so positioned as to engage contacts 55 and 56, respectively, when the device operates in the manner to be hereinafter described.

Hereinbefore the pivotal mounting of several of the parts with relation to other parts has been mentioned. This pivotal mounting may be of any desired type but may also advantageously take the form of the mounting disclosed in Figure 4. This construction provides all the advantages of knife edge pivotal mounting and obviates to a large extent the necessity for fine machining of certain of the parts. Thus as shown in Figure 4, the pivot pin may take the form of a block 90 which may be substantially rectangular in cross section and have a relatively flat surface 91 in place of the conventional knife edge. An aperture 92 is provided to receive pivot pin 90. In configuration aperture 92 is comprised of a pair of relatively flat sides 93 and 94 disposed in acute angular relationship to each other and forming stops to limit the pivotal movement of member 90 by abutment with the opposed flat sides 95 and 96 thereof. The side 97 of aperture 92 adjacent the angle formed by sides 93 and 94 is convexly arcuate in configuration with respect to side 91 of pivot pin 90. Thus it will be seen, that side 91 is in tangential relationship to the arc of side 97 at all times regardless of its position of adjustment with respect to angularly disposed sides 93 and 94 and that thus by this point-to-point contact a structure providing the full equivalent of a knife edge is provided at a relatively small cost and with a minimum of machining of the parts.

The operation of the structure hereinbefore discussed is as follows. Assuming the parts to be in the position shown in Figure 1, an increase in pressure causes bellows 34 to expand and move operating rod 39 upwardly. Movement of operating rod 39 causes movement of pin 47 and consequent movement of lever 46 about the fulcrum provided by extending portion 45. Such upward movement, in turn, causes pivotal movement of lever 48 and consequently permits spring 58 to cause inward movement of projections 50 and member 51 which is, in turn, pivoted to lugs 52 and consequent separation of contacts 54 and 55 with contacts 85 and 86, respectively, the mechanism then assuming the position shown in Figure 2.

It will also be seen that as operating rod 39 moves upwardly, the tension of spring 76 is increased requiring a relatively greater force to complete the movement of operating rod 39 to its uppermost limit and the consequent complete separation of contacts 55 and 56 from contacts 85 and 86. It is also true that an increasing force is necessary to continue to expand bellows 34 and that the force exerted by the spring 35 decreases as the bellows 34 expands. The force necessary to balance the variations in these forces is supplied by spring 58 in the following manner. It will be seen that with the parts in the position shown in Figure 1, the fulcrums of levers 46 and 48 and the projections 50 of member 51 lie in straight line relationship and that spring 58 exerts a force on member 51 in a direction in substantial parallelism to the above mentioned straight line relationship. Thus, the component of force exerted by spring 58 is ineffective to occasion any pivotal movement of levers 46 and 48 or member 51. Correspondingly, the contacts 55 and 56 are held in engagement with their opposed contacts 85 and 86 through the pressure exerted not only by the abutment of levers 46 and 48 with extension 50 of member 51 but also by the normal resiliency of resilient bar 54, it being noted that the arrangement of the parts is such that when levers 46 and 48 are in the above mentioned straight line relationship, the contacts 55 and 56 are forced into relatively close association with opposed contacts 85 and 86 in such manner that energy is stored up in bar 54 to insure a relatively firm contact pressure. However, immediately upon disruption of this straight line relationship, spring 58 begins to exert a force to rotate member 51 about its pivot positioned in lug 52. As the disalignment increases, the component of force exerted by spring 58 is increased and by suitable adjustment of screws 68 and 75 such increasing force may be arranged to exactly compensate for the variations in forces due to the spring rates of the main adjusting spring 76, the bellows 34, and the biasing spring 35. When springs 58 and 76 are so adjusted, it will be seen that the movements of contacts 55 and 56 towards or away from their opposed contacts 85 and 86 will be relatively slow but steady and continuous upon the achievement of a predetermined condition in bellows 34. Thus, for example, if the bellows 34 is so arranged as to operate to open the contacts upon the achievement of five pounds of pressure, the contact will be fully opened upon the achievement of such five pounds of pressure. Assume, for example, that the parts are in the position shown in Figure 1. At this time the spring 58 can exert no force tending to move the operating rod 39 vertically because the force exerted by the spring 58 is transmitted through the levers 48 and 46 whose fulcrums are located in the same straight line so that no turning force is transmitted to the lever 46 and therefore the force has no vertical component affecting the operating rod 39. As the bellows 34 starts to expand, the operating rod 39 will rotate lever 46 slightly about its fulcrum 45 which will disalign the fulcrums for the levers 46 and 48. This means that the force exerted by the spring 58 will now have a small vertical component due to the angle between the levers 46 and 48. As the bellows expands, its own internal force resisting expansion will increase and the force of the tension spring 76 resisting expansion of the bellows will increase and the force exerted by the spring 35 aiding this added expansion of the bellows will decrease. As a result, if the original force is to be sufficient to move the bellows throughout its entire stroke an additional force must be added aiding expansion of the bellows which is equal to the sum of the changes in the three forces just mentioned. This additional force is supplied by the spring 58 through the levers 46 and 48. The greater the expansion of the bellows 34, the greater will be the additional force required and the greater the vertical component of the force exerted by the spring 58 due to the fact that the angle between the levers 46 and 48 will have increased. The size and strength of the spring 58 is so selected that as the bellows expands the vertical component of the force exerted by this spring will exactly compensate the variations in the forces due to the bellows and the two springs 76 and 35. Therefore, after the bellows 34 once starts to expand it will continue to expand until it has moved through its entire stroke because the spring rates of the bellows and the two springs 76 and 35 will have been compensated and the expanding force acting on the bellows will be unopposed. It will also be readily understood that by further suitable adjustment of screw 68, spring 58 may be tensioned to such a point that as the straight line relationship of levers 46 and 48 is disrupted the component of force exerted by spring 58 is greater than the increased force due to the spring rates of the various elements whereby the contacts will engage or disengage with a relatively abrupt or snap action.

While in the above the mechanism has been discussed as operating upon opening movement, it will readily be seen that the same results are achieved upon closing movement. As the bellows 34 contracts from the position shown in Figure 2, the resiliency in the bellows tending to cause such contraction will decrease and the force exerted by spring 76 tending to cause contraction of the bellows will decrease and the force exerted by spring 35 opposing such contraction will increase. Therefore, if it is desired that the force permitting the bellows to start its downward stroke shall be sufficient to move it throughout its entire stroke, it will be necessary to compensate for the variations in the above forces. This is accomplished by the effect of spring 58 on the operating rod 39 through the levers 46 and 49. In the position shown in Figure 2, this spring will be exerting its greatest force which is tending to hold the rod 39 in its upper position. However, after the rod once starts moving down under the influence of bellows 34, that component of force exerted by the spring 58 will decrease due to the fact that the angle between the levers 46 and 48 is decreasing and this component of force decreases in accordance with the variations in the above mentioned forces until the bellows has reached the position shown in Figure 1, at which time the spring 58 will exert no force tending to move the operating rod 39 vertically. Thus it will be seen that the spring rates of the bellows 34, spring 76, and spring 35 have been exactly compensated for so that once a force is developed sufficiently to start the bellows from either end of its stroke that force will be sufficient to move it throughout its entire stroke so that the parts will never be in an intermediate position.

Refering now to the form of mechanism shown in Figures 5 to 11, inclusive, 100 generally indicates a mounting plate to which is secured in any suitable manner a housing 101. Contained within housing 101 is a bellows 102 suitably secured to a plate 103 which is, in turn, secured peripherally to housing 101 in a fluid tight manner. A suitable volatile fluid or other condition responsive media may be contained in housing 101 and serve through variations in the condition to which it is responsive to expand or contract the bellows 102, such contraction or expansion serving to move a plate 104 secured to the lower end of the bellows. Secured in any suitable manner to plate 104 is an operating member 105 which extends upwardly out of housing 101. For convenience in replenishing the volatile fluid or other media contained in the housing 101, a passageway 106 is provided in operating member 105 and closed by a screw 107 having a point serving to form a needle valve as shown at 108.

A spring 109 surrounds operating rod 105 and a conventional shield 110 is provided to prevent complete collapse of bellows 102. The lower end of spring 109 abuts the plate 104 and the upper end is in abutting relationship with a collar 111 having a centrally positioned aperture 112 through which operating rod 105 projects. Collar 111 is provided with a pair of oppositely disposed depressions 111a for a purpose to be more fully described hereinafter. A member 113 is threaded into a suitable aperture in operating rod 105 and carries at its extremity a pivot pin 114 upon which is mounted a lever 115. Lever 115 is comprised of a channel shaped member and carries adjacent an extremity a pair of downwardly depending lugs 116 through suitable apertures in which a pin 117 is passed carrying a pair of roller contacts 118. The opposite end of lever 115 has a pair of oppositely disposed apertures 119 adapted to engage the opposite ends of a pivot pin or bar 120 whereby the lever 115 is fulcrumed on pin 120. Bar 120, in turn, comprises a portion of a member 121 which is secured as by screws 122 to a supporting frame 123 which is secured in any suitable manner as by screws 124 to base plate 100. Supporting member 123 is comprised of a top portion 125 having an elongated aperture 126 therein and a plurality of pairs of downwardly extending legs 127 having outwardly turned portions 128 through apertures in which screws 124 are passed to engage suitable threaded apertures in base plate 100. An upwardly turned lug 130 is formed integral with or may be attached to upper surface 125 of supporting frame 123 and has a threaded aperture passed therethrough. A screw 131 of substantial length passes through aperture in lug 130 and engages a threaded aperture 140 in a lug 132 carried by a movable member 133. Member 133 is comprised of an extending portion 134 having apertures 135 adjacent the extremities thereof and a downwardly depending portion 136 which extends into slot 126 and is, in turn, provided with outwardly flared lugs 137 to hold member 133 in related assembly with slot 126 (see Figure 10).

Thus it will be seen that rotation of screw 131 varies the position of member 134 with respect to the length of slot 126. Lever 115 is provided with a pin 142 projecting therethrough at a point adjacent the roller contacts 118. Pin 142 provides securing means for the ends of a pair of coil springs 143, the opposite ends of which engage apertures 135. Thus, it will be seen that varying the position of screw 131 and hence lug 132 and member 133 varies the tension in springs 143 in a manner and for a purpose to be hereinafter described.

Roller contacts 118 are positioned for engagement with either of two pairs of stationary contacts 150 and 151, and 152 and 153, respectively. Contacts 150 and 151, 152 and 153 are carried by suitable resilient supporting arms secured, as by screws 154, to an insulating block 155 carried in turn by a bracket 156 secured, as by screws 157, to base plate 100. An insulating member 158 is also secured in a similar manner to bracket 157 and serves as a stop member to preclude downward movement of roller contacts 118 beyond a position of engagement with contacts 150 and 151. Suitable lead wires (not shown) may be secured by screws 154 to establish electrical contact with contacts 150, 151, 152 and 153.

A lever 160 is mounted on a suitable pivot 161 carried by one pair of legs 127 of supporting frame 123. Lever 160 is provided with a bifurcation comprised of two extending members 164, each being provided with a downwardly extending pointed projection 165 adapted to engage depressions 111a of collar 111. The opposite end of lever 160 is provided with an angularly disposed portion 167 having a pair of downwardly depending lugs 168 through which are passed apertures to maintain therein the extremities of a pin 169 supporting a roller 170.

Positioned on base plate 100 is a cam 171 provided with a plurality of ridges on its upper surface, the ridges being so spaced that the depressions therebetween are of sufficient extent to engage roller 170. Cam 171 is mounted on a rotatable member 172 provided with a centrally disposed axle 173 which extends through an aperture in base plate 100. A knob 174 is positioned on the outer extremity of axle 173. Thus it will be seen, that rotation of knob 174, in turn, rotates axle 173, member 172 and hence cam 171. Correspondingly, it will be seen that as cam 171 is rotated, roller 170 engages the various depressions hereinbefore described between the ridges on the cam surface of cam 171 and that each of these ridges is positioned at a different height on the cam surface so that that end of lever 160 carrying roller 170 is raised or lowered in accordance with the position of cam 171, such raising or lowering varying the position of collar 111 through the engagement of projections 165 with depressions 111a to vary the compression of spring 109.

It may here be pointed out that lever 115 carries an insulating shield 180 secured thereto as by rivets 181 and that such insulating shield is provided with an extending portion 182 between roller contacts 118 and pin 142 in order to preclude the establishment of an arc therebetween.

In operation of the device, as the volatile fluid in casing 101 expands, bellows 102 is contracted to force operating rod 105 upwardly and hence member 113 and its associated pivot 114 whereby lever 115 is moved to displace contacts 118 from engagement with contacts 150 and 151 as shown in the position of Figure 6, and force them into engagement with the contacts 152 and 153, as shown in Figure 7. Springs 143, it will be noted, exert an upward component of force upon lever 115 only when the straight line alignment of contacts 118, pin 142, pin 114 and the pivot 120 are displaced. When the parts, for example, are in the position shown in Figure 6, the component of force exerted by springs 143 is ineffective to move lever 115 and hence roller contacts 118. However, upon a slight increase in pressure, the straight line relationship of the parts is disturbed and the tension of springs 143 is immediately effective, acting through pin 142 to move lever 115 upwardly about its fulcrum 120 to the position shown in Figure 7. Correspondingly, relief of pressure in housing 101 causes expansion of bellows 102 whereupon the spring 109, which it should be pointed out is considerably more powerful than both of springs 143, moves bellows 102 and consequently roller contacts 118, through operating member 105, downwardly into engagement with contacts 150 and 151.

It will be seen, therefore, that the springs 143 serve to compensate for the increasing component of force exerted by the increased compression of spring 109 as operating member 105 is moved upwardly and also for the additional force required to further expand bellows 102, for as the compression of spring 109 is increased the tension of springs 143 acting in a direction opposed to the component of force exerted by spring 109 is correspondingly increased and upon the achievement of a given pressure upon bellows 102, the roller contacts 118 may be moved from their position of engagement with contacts 150 and 151 to their position of engagement with contacts 152 and 153. It will also be seen that the speed of movement of the contacts may be readily varied by a simple adjustment of the tension in springs 143 through movement of screw 131 and that the compression of spring 109 may be readily varied by rotation of knob 174 and consequent rotation of cam 171. Accordingly, the speed of movement of roller contacts 118 from one position to the other may be readily varied as may the pressure required to be exerted upon bellows 102 to move contacts 118 from one position of engagement to the other.

Referring now to that modification of the invention disclosed in Figures 12 to 15, inclusive, a base plate 200 has secured thereto a housing 201. Such securing may take the form of passing a threaded portion 202 of housing 201 through a suitable aperture in plate 200 and securing a nut 203 thereon. Housing 201 has a base plate 204 to which is secured a bellows 205 suitably sealed against pressure. To a downwardly extending portion 206 of base plate 204 threaded as shown at 207 may be attached any suitable pressure or temperature or other condition responsive device (not shown) but which may conveniently take the form of a conventional pressure tube leading to a source of pressure. A spring 208 normally biases bellows 205 upwardly as viewed in Figure 12. A guide member 209 is also provided to prevent collapse of bellows 205. Secured to the upper portion of bellows 205 is a lug 210 adapted for engagement with the threaded end 211 of an operating rod 212. Operating rod 212 is provided with a pair of oppositely disposed notches 213 and 214 at one point of its length. The purpose and function of these notches will be described hereinafter.

Secured to base plate 200 is a supporting frame 215, such securing means taking the form of rivets 216. Supporting frame 215 has two inwardly turned lugs 217 adapted to support a disc 218 rigidly secured to operating rod 212. Disc 218 is formed with a ridge 219 thereon and supports a coil spring 220. The upper end of spring 220 abuts a member 221 provided with an extending lug 222 which projects into a slot 223 in frame 215. Projecting through suitable apertures in the top of frame 215 and member 221 is a screw generally indicated at 224 having a head 226 and threaded as at 225. Thus it will be seen that rotation of head 226 of screw 224 moves member 221 upwardly or downwardly, this member being precluded from rotation by the projecting lug 222, to increase or decrease the compression of spring 220 for a purpose to be described hereinafter. Likewise, it will be seen that expansion of bellows 205 moves operating rod 212 upwardly against the compression of spring 220, such compression as above stated being adapted to be varied by rotation of screw 224.

Carried by a pair of lugs 230 struck from supporting frame 215 is a block 231 pivoted as by a pivot pin 232 to lugs 230. Block 231 is provided with a notch 233 corresponding in configuration and disposed adjacent to notch 214. A toggle member 234 provided with a double knife edge is fitted between notches 214 and 233. It will thus be seen that movement of operating rod 212 imparted to toggle 234 results in a pivotal movement of block 231. Block 231 is provided with an extending projection 235 formed with a hook 236 adapted to engage an end 237 of a coil spring 238. The other end of coil spring 238 is secured to a threaded member 239 carrying a projection 240 adapted to engage in a slotted aperture 241 in supporting frame 215. A screw 242 is passed through an aperture in a projection 243 struck outwardly from frame 215 and engages the threaded interior portion of threaded member 239. Thus, it will be seen that rotation of screw 242 results in varying the tension imparted to spring 238 since the projection 240 is rigidly affixed to threaded member 239 and rotation of screw 242 can consequently result only in an increase or decrease in the tension in spring 238.

A lever 250 having a pair of knife edged surfaces 251 and 252 is positioned adjacent notch 213 in such a manner that knife edge 251 engages therewith, knife edge 252 engaging with a corresponding notch 253 in a projection 254 carried by a member 255 secured to frame as by rivets 256 (see Figure 15).

As better shown in Figure 15, lever 250 is bowed outwardly to extend around framework 215 and has a link 257 secured to its outer end as by a pivot pin 258. Link 257 may be comprised, if desired, of two link like members (see Figures 14 and 15). A pivot pin 259 secures a pair of links 260 and 261 to the end of link 257 opposite pin 258. Link 261 is pivoted as by a pin 262 to a projecting member 263 secured in any desired manner as by rivets 264 to the outer surface of supporting frame 215. Link 260 is pivotally secured as by a pin 265 to a mid-portion of an arm 270 which, in turn, is pivoted as by a pivot pin 271 to the extremity of projection 263. The lower end of arm 270 carries an insulating block 275 which, in turn, carries a resilient arm 276 having a cross piece 277 carrying contacts 278. An insulating block 279 is secured as by screws 280 to a portion of base plate 200. Insulating block 279 carries a pair of contact clips 281 each of which carries a contact 282 positioned for engagement with contacts 278. Contact clips 281 are in electrical association with terminal clips 283 to which suitable conductors (not shown) may be attached.

Thus, from the foregoing it will be seen that as the pressure in the bellows 205 is increased, operating rod 212 is moved upwardly against the pressure of spring 220. Such upward movement results in a corresponding upward movement of the inner knife edges of lever 250 and toggle 234 to cause the parts to assume the position shown in Figure 13. It will be noted that the contacts 278 and 282 engage before the lever 270 attains its final position. The completion of the movement of lever 270 is permitted by the flexing of the resilient arm 276. This upward movement of knife edge 251 causes a downward movement of lever 250 causing link 257 to be moved downwardly and links 260 and 261 to assume the straight line position shown in Figure 13 forcing arm 270 outwardly and hence contacts 278 into engagement with contacts 282. Upon a relief of the pressure in bellows 205, spring 220 forces operating rod 212 downwardly and causes link 234 and lever 250 to reassume the position shown in Figure 12 whereupon by upward movement of lever 250 contacts 278 are caused to separate from contacts 282. As has been pointed out in connection with other forms of structure embodying the invention, as the pressure in bellows 205 forces operating rod 212 upwardly, the compression of spring 220 occasions a greater resistance and the bellows 205 requires a greater force to complete, in this case, the closing of the contacts. In order that no more pressure need be supplied in bellows 205, spring 238 is provided. Since it will be readily seen that as the compression of spring 220 is increased, so likewise, is the tension of spring 238 slightly increased and that as levers 250 and toggle 234 assume the straight line relationship shown in Figure 13, block 231 is correspondingly pivoted in a direction away from operating rod 212 and correspondingly extension 235 is moved downwardly slightly to increase the tension on spring 238.

The device may be so adjusted that upon the achievement of a given pressure in the bellows, the contacts will be closed without any subsequent increase in pressure being required. As soon as the compression of spring 220 is increased, the component of force exerted by spring 238, which it will be noted is directed in the same direction as that exerted by spring 220, is decreased to compensate for such increased compression. It will also be understood that by suitably varying the tension of spring 238, a varying operating differential may be readily achieved. Correspondingly, if the tension in spring 238 is considerably greater than the compression in spring 220, the contacts will close relatively rapidly and with a comparatively snap action. If, however, the springs are so adjusted that the force component of spring 238 merely equalizes the increasing force component of spring 220, the contacts will move comparatively slowly and smoothly into and out of engagement. It will also be seen that by the unique leverage arrangement above described, a substantial multiplication of motion is provided imparting a relatively slight movement of the bellows to the contacts as a relatively great movement thereof.

It will be noted that the mechanical advantage of the operating rod 212 over the movable contact arm 270 is infinitely great at the position where the levers 260 and 261 are in a straight line relation, and this mechanical advantage is reduced rapidly as the levers leave the straight line relationship so as to give an increased movement of the movable contact arm. This high mechanical advantage near the straight line position of levers 260 and 261 makes possible a relatively large force for holding contacts 278 and 282 together and pulling them apart and when the levers leave the straight line position the movable contact moves more rapidly to sufficiently separate the two contacts.

It might also be pointed out that when the levers 260 and 261 are in a straight line position they can transmit no force tending to move operating rod 212. This means that any variation in the contact pressure between contacts 278 and 282 cannot be transmitted to rod 212 to affect the pressure at which the bellows opens the contacts.

It will also be seen that when the parts are in the position shown in Figure 13, the component of force exerted by spring 238 upon contacts 278 is substantially zero since the straight line relationship of extension 235, link 234, lever 250 and contacts 278 permit substantially no mechanical advantage of the spring over any of these parts. However, as soon as this straight line relationship is disrupted, the tension of spring 238 becomes correspondingly felt and functions in the manner above described.

Thus it will now appear that the combination of the above described spring arrangement, leverage arrangement and straight line relationship results in a structure which will achieve the objects of the invention in an advantageous and reliable manner.

Having reference now to the structure shown in Figures 16 to 22, inclusive, which comprises a switching mechanism embodying certain features of this invention as shown in the preceding modifications as well as certain additional features, a casing 300 is disclosed to which is secured in any suitable manner, as by screws 301, a housing 302. Positioned within housing 302 is a bellows 303 of conventional construction having a bottom plate 304 to which is secured an operating rod 305 provided with a tip 306 and a nut 307 forming an annulus. A sleeve 308 comprising an integral part of housing 302 extends downwardly to a position spaced from base plate 304 and has an inwardly turned flange 309 forming a seat for an end of a coil spring 310, the other end of which abuts annulus 307. A suitable plug 311 may comprise a substantially integral part of housing 302 and has threadedly engaged therewith a capillary tube 312. Capillary tube 312 may extend to a suitable fluid filled condition responsive bulb of any desired construction (not shown). Thus, a change in the value of a condition adjacent the bulb will by volatilization of the fluid contained therein cause expansion and contraction of bellows 303 and consequently upward and downward movement of operating rod 305 in a well known manner.

The pointed tip 306 of operating rod 305 engages a recess 315 in a cup-like member 316 rigidly secured to a lever 317. Lever 317 is pivotally mounted on a pair of knife edges 318 which comprise portions of an extending member 320 secured in any desired manner to casing 300, it being pointed out that notches 319 are provided in lever 317 to accommodate knife edges 318. A portion of member 320 extends through a suitable aperture in a lug 321 which extends upwardly from the base of casing 300 to provide a relatively rigid mounting for knife edges 318 (see Figure 16). The opposite end of lever 317 is movable between the head 325 of a screw 326 and the end 327 of a second screw 328, the screws being secured by nuts 329 and 330 respectively to the lower wall of casing 300 and extending therethrough. Thus it will be seen that by suitable rotation of screws 326 and 328, the range of movement of lever 317 may be varied. Rigidly secured to lever 317 in any desired manner is an upwardly extending portion 331 provided at its end with an inwardly extending portion 332 provided with a recess 333 and with a projection 334 intermediate its length. Pivotally secured to projection 334 as by a pivot 335 is a link 336. Link 336 is pivoted at its other end as by a pivot 337 to a downwardly extending lug 338 carried by an arm 340. Arm 340 has a second downwardly depending lug 341 which is pivotally mounted as by a pivot pin 342 in a bracket 343 which, in turn, is rigidly secured as by screws 344 to a side wall of casing 300. The distal end of lever 340 has secured thereto as by rivets 350 a block of insulating material 351. Positioned adjacent the extremity of block 351 is a contact structure carrying contacts adapted to engage other contacts, all as will be more fully pointed out hereinafter.

Thus from the foregoing, it will be seen that upon an increase in pressure or temperature, bellows 302 is contracted to move operating rod 305 upwardly and hence move lever 317 about its fulcrum on knife edge 318 until it assumes the position shown in Figure 17, correspondingly, moving member 331 into the position shown in Figure 17 whereupon link 336 will move about its pivots 335 and 337, respectively, in turn acting against lug 338 to rotate arm 340 about its pivot 342 and move insulating block 351 and its associated contact structure upwardly into engagement with the opposed contacts. Upon a decrease in pressure means now to be described are provided to reopen the contacts.

Lever 317 is provided with a notch 355 having a recess 356, as better shown in Figure 19, therein. Positioned adjacent this notch is a plug 357 having a knife edge 358. Plug 357 is provided with an upwardly extending portion 360 and is of such configuration with respect to recess 356 that normally it will not pass therethrough and so positioned that knife edge 358 engages notches 355. One end 361 of a spring 362 engages a suitable recess in upwardly extending portion 360. The other end of spring 362 is secured to a member 363 having an internal threaded aperture therein through which is passed a screw 364 which, in turn, passes through a suitable aperture in the upper wall of casing 300. Screw 364 is provided with a head 365 having a groove 366 therein for suitable engagement by a tool for a purpose to be later described. Comprising an integral part of member 363 is an extension 370 adapted to pass through a slot 371 in the side wall of casing 300. Extension 370 is provided with a pointer 372 for a purpose to be described hereinafter. Thus, it will be seen that spring 362 biases lever 317 about knife edge 318 in a direction counter to the direction in which it is urged by operating rod 305. Likewise, by rotation of screw 364, the tension on spring 362 may be varied in order that pressures of different values may be required to move the contact structure to closed position in the manner previously described. Upon relief of such pressure, it will be understood that spring 362 moves lever 317 to return the contacts to open position. It will be understood, however, that as the contacts move from open to closed position and lever 317 moves downwardly, the tension in spring 362 is increased and accordingly to fully open the contact an increasing force must be exerted by operating rod 305. In order that the contacts may open fully upon the achievement of a predetermined pressure or other condition, suitable means now to be described are provided to compensate for such increased tension in spring 362 and also for the increased force required to move bellows 303.

Secured to the back wall of casing 300 is a mounting bracket 375 having an inwardly extending portion 376 and a portion 377 positioned in parallel relation to the back wall of casing 300. Portion 377 is provided with a slotted aperture 378 through which is passed a pivot pin 379 held in position by a lock nut 380. Upon release of lock nut 380, it will be understood that the position of pivot pin 379 in slotted aperture 378 may be varied for a purpose to be later described. Mounted on pivot pin 379 is a lever 381. Lever 381 is provided with a downwardly extending portion 382 and an angularly disposed portion 383. Portion 383 is provided with an aperture through which is passed one end 384 of a spring 385. The other end of spring 385 carries a member 386 of configuration similar to member 363 and having an internally threaded aperture therethrough. A screw 387 is passed through the aperture in member 386 and a corresponding aperture in the top wall of casing 300. Screw 387 has likewise a head 388 having a groove 389 therein for the engagement of a suitable tool in order that tension exerted by spring 385 may be varied as desired. The purpose of such variation will be more fully described hereinafter. Member 386 is also provided with a downwardly extending portion 390 similar to extension 370 and provided correspondingly with a pointer 391, extension 390 being passed through a slot 392.

Referring now to Figure 18 it will be seen that lever 381 is provided with a notch 394 (Figure 16) adapted to be engaged by a knife edge 395 comprising a portion of a link 396 which carries at its other end a corresponding knife edge 397 adapted to engage notch 333 of extension 332 of member 331.

Thus from the foregoing, it will be readily understood that spring 385 through lever 381 and link 396 exerts a force on member 331 and consequently on lever 317 as soon as the straight line relationship of pivots 337, 335 and knife edge 318 is disrupted, but that when such straight line relationship as disclosed in Figure 17 exists the component of force exerted by spring 385 is zero while the direction thereof is substantially parallel to the above mentioned straight line relationship. However, upon a decrease in pressure resulting in a downward movement of that end of lever 317 adjacent operating rod 305 and the consequent disruption of this straight line relationship, an increasing force is exerted by spring 385 through link 396 to force member 331 outwardly and consequently move link 336 to move arm 340 in a downward direction. By suitable adjustment of screws 387 the force exerted by spring 385 may be adjusted exactly to compensate for the increasing tension of spring 362 and bellows 303 as the same is increased by downward movement of block 357 by lever 317. Likewise, by suitable adjustment, the tension in spring 385 may be so increased as to provide an increasing force in excess of the decreased tension of spring 362 in order that when the above mentioned straight line relationship is disrupted, as such disalignment proceeds, the force component exerted by spring 385 is such as to overcome the force component of spring 362 sufficiently to impart a snap action to the movement of arm 340 and its associated contacts. Likewise, as the pressure increases to move operating rod 305, the parts will move from the position shown in Figure 16 to that shown in Figure 17 with a snap action.

Referring now to the contact structure, secured to insulating block 351 is a pin 400 having a head 401. Slidably mounted upon pin 400 is a bar of conductive material 402 provided with contacts 403. Bar 402 is provided with depending lugs 404 (Figure 22) positioned for engagement with suitable apertures 405 in insulating bar 351 to prevent rotation of bar 402 about pin 400. A spring 406 is positioned between head 401 of pin 400 and bar 402 and serves to bias bar 402 to its associated contacts in the direction of insulating block 351. Suitable stationary contacts 407 are mounted, as by means of nuts 408 and 409, in the top wall of casing 300. Leads 410 may be suitably secured, as by nuts 408 to provide electrical connection with the contacts 407, which connection will be bridged between the two contacts 407 by the opposed contacts 403 and bar 402. Thus, upon a closure of contacts 403 and 407 in the manner previously described, insulating block 351 is moved to the position shown in Figure 21, spring 406 is compressed and contacts 403 are held in comparatively tight engagement with contacts 407 by the normal resiliency of spring 406. Correspondingly, when the pressure actuating the mechanism to contact closing position is relieved, there will be a substantial movement of the parts hereinbefore described prior to a separation of the contacts which will not occur until the tension on spring 406 has been entirely relieved and insulating bar 351 abuts bar 402 to move the same and its associated contacts 403 out of the position shown in Figure 17. Thus, a relatively firm contact pressure is maintained at all times until such time as the parts of the mechanism have moved into a position where the resultant movement of the contact structure is relatively fast. Likewise, in the event of sticking between contact 403 and its associated contact 407, a pivotal movement of bar 402 is permitted against the pressure of spring 406 in order to effect a rocking movement of the contact and disengage the sticking thereof.

As best shown in Figure 20, a scale plate generally indicated at 415 is provided on one side of casing 300. Scale plate 415 is comprised of two separate portions 416 and 417, each bearing indicia 418 and 419, respectively, thereon. Separate portions 416 and 417 are provided with apertures 420 and 421, respectively, positioned in alignment with apertures 392 and 371, respectively. Extensions 370 and 390 extend through apertures 421 and 420, respectively, and lugs 372 and 391 serve as pointers with respect to indicia 419 and 418, respectively. Scale plates 416 and 417 are each provided with a pair of vertically extending slots 425 and 426, respectively, through each of which is passed a screw 427 which screws in turn, engage suitable threaded apertures in the side wall of casing 300. Thus, it will be seen that by loosening screws 427 in slots 425, scale plate 416 may be moved upwardly or downwardly within the limits of range of slots 425 and that by loosening screws 427 in slots 426, scale plate 417 may be moved upwardly or downwardly within the range of slots 426. An important advantage is achieved by this construction in that if the instrument is previously calibrated in the factory to operate at certain given conditions and these conditions are known, should there be any discrepancy between the known settings and the indicia, such discrepancy may be readily corrected by a simple movement of the scale plate rather than as was hitherto the case, a complete recalibration of the instrument.

Casing 300 may, if desired, be provided with mounting lugs 430 whereby it may be secured to any desired surface.

It will be understood that in connection with all the foregoing described instruments embodying this invention suitable housings or casings may be provided in order to enhance the appearance of the instruments as well as protect the working parts.

In the foregoing description it has been set forth how the spring rate of the main adjusting spring and the operating bellows has been compensated. It is emphasized that the purpose of this invention is to compensate for the spring rates of all springs which affect the operation of the movable contact arm by the bellows. Thus the spring rates of spring 35 in the first modification, spring 208 in the second modification, spring 109 in the third modification, and spring 310 in the fourth modification are compensated in the same manner and by the same spring.

Thus from the foregoing, it will be seen that there are herein provided a plurality of structures embodying the instant invention and achieving the objects thereof in a reliable and effective manner including many advantages of great practical importance.

As many additional embodiments may be made of the above described invention and as many modifications may be made in the embodiments hereinbefore described and shown in the accompanying drawings, it is to be understood that all matter hereinbefore described or shown is to be interpreted merely as illustrative and not in a limiting sense.

I claim as my invention:

1. In a device of the character described, in combination, a fixed contact, a movable contact adapted to engage and disengage said fixed contact, means to move said movable contact, a plurality of levers connecting said means to said movable contact, said levers serving to transmit a relatively small movement of said means into a relatively great movement of said movable contact, said levers being so arranged that the fulcrums of a plurality of levers lie in straight line relationship with respect to the component of force exerted by said means as said movable contact is moved into engagement with said fixed contact whereby upon displacement of said straight line relationship an amplification of movement of said movable contact results and upon resumption of said straight line relationship a relatively great force component is exerted to hold said movable contact in juxtaposition to said fixed contact.

2. In a switching mechanism including a fixed contact, a movable contact and means to move said movable contact, in combination, a fulcrumed member movable by said means, a lever movable by said member and a second lever connected to said movable contact and movable by said first lever, said member and said first lever lying in straight line relationship as said movable contact is moved into engagement with said stationary contact whereby a relatively decreasing movement of said means is necessary to move said movable contact away from said stationary contact a relatively increasing amount.

3. In a switching mechanism, in combination, a fixed contact, a movable contact adapted to engage and disengage said fixed contact, a resilient member carrying said movable contact, means to move said resilient member and hence said movable contact, a plurality of levers connecting said means to said member and serving to transmit a relatively small movement of said means into a relatively great movement of said member, said levers being so arranged that the fulcrums of two or more of said plurality of levers lie in straight line relationship with respect to the component of force exerted by said means as said contacts are moved into engagement, whereby a relatively large force is available for opening and closing said contacts, and a relatively large movement of said movable contact will occur after said straight line relationship has been disrupted.

4. In a switching mechanism, in combination, a fixed contact, a movable contact adapted to engage and disengage said fixed contact, a resilient member carrying said movable contact, means to move resilient member and hence said movable contact, a plurality of levers connecting said means to said member and serving to transmit a relatively small movement of said means into a relatively great movement of said member, said levers being so arranged that the fulcrums of two or more of said plurality of levers lie in straight line relationship with respect to the component of force exerted by said means as said contacts are moved into engagement, whereby upon displacement of said straight line relationship an amplification of movement of said resilient means results and upon resumption of said straight line relationship a relatively great force component is exerted against said resilient means to hold said contacts in engagement, said force being sufficient to warp said resilient means in such manner and to such degree that the resilience thereof is sufficient to hold said contacts in close engagement.

5. In a switching mechanism including a fixed contact, a movable contact and means to move said movable contact, in combination, a member movable by said means, a resilient member carrying said movable contact, a lever movable by said member and a second lever connecting said first lever and said resilient means, the fulcrums of said levers lying in straight line relationship with respect to each other as said movable contact is moved into engagement with said stationary contact whereby upon displacement of said straight line relationship the movement of said movable contact is amplified with respect to the movement of said means, said levers when in straight line relationship biasing said resilient member in such manner and to such a degree that the resiliency thereof serves to hold said contacts in engagement with a relatively substantial force.

6. In a switching device, in combination, a condition responsive means movable in response to change in the value of a condition, a member movable by said means, a lever movable by said member, a contact carried by said lever, and a fixed contact adjacent said movable contact and adapted to be engaged thereby, resilient means biasing said member in a direction opposite to the force exerted by said condition responsive means, and means to vary the tension in said resilient means, whereby to change the condition value required to move said member and hence said movable contact, said last mentioned means comprising a pivoted lever engaging an end of said spring, a roller carried by the opposite end of said last mentioned lever, a cam member adjacent said roller, said cam member having a serrated cam surface whereby said roller is engaged in one of said serrations and the number of possible positions thereof limited to the number of serrations, and means to vary the serration of said cam member adjacent said roller.

7. An adjustment means for use in a switching mechanism including a movable contact, condition responsive means movable in response to changes in the value of a condition, a member operable by said condition responsive means to move said contact and resilient means opposing the force exerted by said condition responsive means; comprised of a lever one end of which abuts an end of said resilient means, a cam member, the other end of said lever abutting said cam surface, and means to vary the dwell of said cam member adjacent said other end of said lever, the surface of said cam member being provided with a plurality of ridges thereon, whereby upon movement of said cam said other end of said lever ratchets upon said ridges but when said cam is stationary said ridges serve to hold said other end of said lever in fixed position upon said cam surface and prevent slippage thereof occasioned by the force of said resilient means thereagainst.

8. In a device of the character described comprising a plurality of parts pivotally mounted with respect to each other, an artificial knife edge mounting comprised of a pivot of substantially rectangular cross section carried by one of said parts, another of said parts having an aperture therein adapted to receive said pivot pin, said aperture having two substantially straight sides disposed in acute angled relationship to each other, and a third side connecting said angled sides, said third side being convexly arcuate in configuration with respect to and abutting said pivot pin, whereby said pivot pin is fulcrumed on said arcuate side and said angled sides limit the movement thereof.

9. In a device of the character described comprising a plurality of parts pivotally mounted with respect to each other, an artificial knife edge mounting comprised of a pivot member having a substantially flat surface carried by one of said parts, another of said parts having an aperture therein adapted to receive said pivot member, said aperture having a convexly arcuate surface abutting said flat surface, whereby said surface is in tangential relation to a point on said arcuate surface in any position with respect thereto and said point serves as a fulcrum for movement of pivot member.

10. In a switching mechanism, in combination, a supporting member, a condition responsive means movable in response to changes in the value of a condition, mechanism operable thereby, resilient means opposing the movement of said condition responsive means, additional resilient means, associated with said mechanism compensating the increased force of said first mentioned resilient means upon movement of said condition responsive means against the resiliency thereof, an indicator fixedly associated with said first mentioned resilient means, a second indicator fixedly associated with said second resilient means, a scale plate adjacent each of said indicators, a slot in each of said scale plates extending in the direction of movement of said indicators and clamping means associated with each of said slots, and said supporting member whereby upon movement of said indicator to a position corresponding to the value of a known condition either of said scale plates may be moved until a portion thereof indicative of said value is adjacent said indicator to calibrate said mechanism without the necessity of internal adjustment thereof.

11. In a switching mechanism, in combination, a condition responsive element movable in response to changes in the value of a condition, a member movable by said element, resilient means opposing the movement of said member, a plurality of levers movable by said member, a resilient member movable by one of said levers, a contact carried by said resilient member, a second contact adjacent said first mentioned contact and a spring connected to one of said levers and biasing said first contact away from said second contact, said levers being so arranged that the fulcrums of two or more lie in straight line relationship when said first contact is in one of its moved positions but not when it is in its other moved position, said spring being so positioned as to exert a force component in the direction of said straight line relationship whereby when said relationship exists the force of said spring is ineffective to move said first contact but when said straight line relationship is disrupted by said movement of said member movement of said levers and hence said contact is compensated by said spring against the increasing tension of said resilient means.

12. In a switching mechanism of the character described, in combination, a condition responsive element movable in response to changes in the value of a condition, a member movable by said element, a lever movable by said member, a second lever movable by said first lever, said first and second levers lying in straight line relationship when said member is in a given position, a contact movable by said second lever, a fixed contact adapted to be engaged and disengaged by said first contact, a spring acting in opposition to the force exerted by said element and said member, and a second spring exerting a component of force in a direction parallel to the straight line relationship of said lever and opposed to the force exerted by said first spring, whereby said second spring is ineffective to move said levers but as said member moves in opposition to the force exerted by said first spring and the force exerted thereby increases said straight line relationship of said levers is disrupted to move said movable contact, said second spring exerting a force component on said movable contact and said levers sufficient to compensate for the increased force occasioned by said first spring.

13. In a switching mechanism of the character described, in combination, a condition responsive element movable in response to changes in the value of a condition, a member movable by said element, a lever movable by said member, a second lever movable by said first lever, said first and second levers lying in straight line relationship when said member is in a given position, a contact movable by said second lever, a fixed contact adapted to be engaged and disengaged by said first contact, a spring acting in opposition to the force exerted by said element and said member, a second spring exerting a component of force in a direction parallel to the straight line relationship of said lever and opposed to the force exerted by said first spring, whereby said second spring is ineffective to move said levers but as said member moves in opposition to the force exerted by said first spring and the force exerted thereby increases said straight line relationship of said levers is disrupted to move said movable contact, said second spring exerting a force component on said movable contact and said levers sufficient to compensate for the increased force occasioned by said first spring, and means to vary the force exerted by said first mentioned spring.

14. In a switching mechanism of the character described, in combination, a condition responsive element movable in response to changes in the value of a condition, a member movable by said element, a lever movable by said member, a second lever movable by said first lever, said first and second levers lying in straight line relationship when said member is in a given position, a contact movable by said second lever, a fixed contact adapted to be engaged and disengaged by said first contact, a spring acting in opposition to the force exerted by said element and said member, a second spring exerting a component of force in a direction parallel to the straight line relationship of said lever and opposed to the force exerted by said first spring, whereby said second spring is ineffective to move said levers but as said member moves in opposition to the force exerted by said first spring and the force exerted thereby increases said straight line relationship of said levers is disrupted to move said movable contact, said second spring exerting a force component on said movable contact and said levers sufficient to compensate for the increased force occasioned by said first spring, and means to vary the force exerted by said second mentioned spring.

15. In a switching mechanism of the character described, in combination, a condition responsive element movable in response to changes in the value of a condition, a member movable by said element, a lever movable by said member, a second lever movable by said first lever, said first and second levers lying in straight line relationship when said member is in a given position, a contact movable by said second lever, a fixed contact adapted to be engaged and disengaged by said first contact, a spring acting in opposition to the force exerted by said element and said member, a second spring exerting a component of force in a direction parallel to the straight line relationship of said lever and opposed to the force exerted by said first spring, whereby said second spring is ineffective to move said levers but as said member moves in opposition to the force exerted by said first spring and the force exerted thereby increases said straight line relationship of said levers is disrupted to move said movable contact, said second spring exerting a force component on said movable contact and said levers sufficient to compensate for the increased force occasioned by said first spring, means to vary the force extended by said first mentioned spring, and means to vary the force exerted by said second mentioned spring.

16. In a device of the character described, a first member pivoted at one point to a support and at another point to one point on a second member, a control member having two control positions, said second member being pivoted at a second point to said control member, and means to rotate one of said first two members, said control member being in one of its control positions when said three pivot points are in a straight line, and in its other control position when said points are disaligned.

17. In a device of the character described, a first member pivoted at one point to a support and at another point to one point on a second member, a control member having two control positions, said second member being pivoted at a second point to said control member, and condition responsive means pivoted to said first member relatively close to where said first member is pivoted to said support, said control member being in one of its control positions when said three pivot points are in a straight line, and in its other control position when said points are disaligned.

18. In a switching mechanism, in combination, a first member pivoted at one point to a support and at another point to one point on a second member, a control member, a movable switch contact, means whereby said movable contact is carried by said control member including a resilient connection, a stationary contact, said second member being pivoted at a second point to said control member, and means to rotate one of said first two members, said control member holding said switch contacts in engagement through said resilient connection when said three pivot points are in a straight line, said resilient connection holding said contacts in engagement during a substantial movement of said one of said members by said means to cause disalignment of said pivot points.

19. In a device of the character described comprising in combination, a resilient actuating element, a movable switch operating member, means including a toggle connecting said resilient actuating element to said switch operating member, and spring means acting on said member resisting movement of said toggle to dead center position, said spring means over compensating the spring rate of the resilient actuating element.

20. In a device of the character described, comprising in combination, a movable contact arm, a resilient condition responsive device, a lever pivoted on a support and adapted to be rotated about said support by said condition responsive device, a link pivotally connected at different points to said lever and said contact arm, said contact arm being in closed circuit position when said pivot points are aligned and in open position when they are disaligned, and means compensating the spring rate of said condition responsive device.

21. In a switching mechanism, in combination, a movable contact arm, a movable contact carried thereby, a stationary contact positioned for cooperation therewith, a bellows, a lever pivoted about a support, said lever being adapted to be rotated in one direction by said bellows, a spring for rotating said lever in the opposite direction, a link pivotally connected at different points to said lever and said contact arm, said contact arm being in a position to close said contacts when said three pivot points are in a straight line and to open said contacts when said pivot points are disaligned, and means to compensate the spring rates of said bellows and said spring.

22. In a switching mechanism, in combination, a movable contact arm, a movable contact carried thereby, a stationary contact positioned for cooperation therewith, a bellows, a lever pivoted about a support, said lever being adapted to be rotated in one direction by said bellows, a spring for rotating said lever in the opposite direction, a link pivotally connected at different points to said lever and said contact arm, said contact arm being in a position to close said contacts when said three pivot points are in a straight line and to open said contacts when said pivot points are disaligned, and means to compensate the spring rates of said bellows and said spring, said means comprising a spring so connected as to exert no force on said bellows when said pivot points are aligned but to exert an increasing force on said bellows as said lever is rotated to disalign said pivot points.

23. In a switching mechanism, in combination, a contact arm rotatably mounted at one end and carrying a movable contact at its other end by means of a resilient connection, a stationary contact positioned for cooperation therewith, a bellows, a lever pivoted about a support, said lever being adapted to be rotated in one direction by said bellows, a spring for rotating said lever in the opposite direction, a link pivotally connected at different points to said lever and said contact arm, said contact arm being in a position to close said contacts when said three pivot points are in a straight line and to open said contacts when said points are disaligned, said contacts remaining closed due to said resilient connection until said lever has been rotated a short distance to disalign said pivot points after which they open, and means to compensate the spring rates of said bellows and said spring.

24. In a switching mechanism, in combination, a contact arm rotatably mounted at one end and carrying a movable contact at its other end by means of a resilient connection, a stationary contact positioned for cooperation therewith, a bellows, a lever pivoted about a support, said lever being adapted to be rotated in one direction by said bellows, a spring for rotating said lever in the opposite direction, a link pivotally connected at different points to said lever and said contact arm, said contact arm being in a position to close said contacts when said three pivot points are in a straight line and to open said contacts when said points are disaligned, said contacts remaining closed due to said resilient connection until said lever has been rotated a short distance to disalign said pivot points after which they open, and means to compensate the spring rates of said bellows and said spring, said means comprising a spring engaging the contact arm and tending to move it in a contact opening direction.

25. In a switching mechanism, in combination, a contact arm rotatably mounted at one end and carrying a movable contact at its other end by means of a resilient connection, a stationary contact positioned for cooperation therewith, a bellows, a lever pivoted about a support, said lever being adapted to be rotated in one direction by said bellows, a spring for rotating said lever in the opposite direction, a link pivotally connected at different points to said lever and said contact arm, said contact arm being in a position to close said contacts when said three pivot points are in a straight line and to open said contacts when said points are disaligned, said contacts remaining closed due to said resilient connection until said lever has been rotated a short distance to disalign said pivot points after which they open, and means to compensate the spring rates of said bellows and said spring, said means comprising a spring engaging said lever and exerting a force thereon in a direct line with said pivot points when they are in a straight line, and in a direction to assist said other spring when the pivot points are disaligned.

26. In a switching mechanism comprising in combination, a bellows, an operating member adapted to be moved longitudinally by said bellows, a main spring resisting such movement, a contact arm rotatably mounted at one end and carrying a movable contact at the other end by means of a resilient connection, a stationary contact, a pair of links pivotally joined at one end, the other end of one link being pivotally joined to said contact arm, the other end of said other link being pivotally connected to a support, a third link one end of which is pivotally connected to said first two links at their juncture, a first lever fulcrumed near one end on a support and fulcrumed at said one end to one side of said operating member, said other end of said first lever being pivotally connected to the other end of said third link, a second lever pivoted to a support, a double knife edge one end of which engages said second lever and the other end of which engages the other side of said operating member directly opposite the point at which said first lever is fulcrumed to it, and a compensating spring tending to rotate said second lever toward said operating member, said two links being aligned with each other and said first lever being aligned with said double knife edge when said contacts are closed at which time the compensating spring exerts no force tending to move said operating member longitudinally, said compensating spring exerting an increasing force on said operating member through said double knife edge as said operating member moves to disalign said first lever and double knife edge and the two links thereby opening said contacts.

27. In a device of the character described comprising in combination, a pivoted lever, a resilient member for rotating said lever, a movable member, a toggle mounted between and carried by said movable member and lever, said movable member exerting a force through said toggle sufficient to compensate the spring rate of said resilient member, control means actuated by said movable member, said control means being in one operative position when said toggle is in substantial alinement with the pivot for said lever, and means preventing said toggle and lever from going beyond said alined position in one direction.

28. In a device of the character described comprising in combination, a condition responsive device, a main adjusting spring for said condition responsive device, a movable cam, and a member engaging one end of said spring and forced thereby into engagement with the face of said cam, said cam face having a series of depressions into which said member seats whereby said cam cannot be accidentally displaced.

DANIEL G. TAYLOR.